(12) United States Patent
Wirth et al.

(10) Patent No.: US 8,001,770 B2
(45) Date of Patent: Aug. 23, 2011

(54) EXHAUST SYSTEM FOR AN INTERNAL COMBUSTION ENGINE

(75) Inventors: Georg Wirth, Kirchheim/Teck (DE); Felix Neumann, Esslingen (DE)

(73) Assignee: J. Eberspaecher GmbH & Co., KG (DE)

( * ) Notice: Subject to any disclaimer, the term of this patent is extended or adjusted under 35 U.S.C. 154(b) by 145 days.

(21) Appl. No.: 12/004,087

(22) Filed: Dec. 19, 2007

(65) Prior Publication Data

US 2008/0148721 A1 Jun. 26, 2008

(30) Foreign Application Priority Data

Dec. 21, 2006 (DE) .................. 10 2006 061 790

(51) Int. Cl.
*F01N 3/00* (2006.01)
(52) U.S. Cl. ............... 60/286; 60/295; 60/301; 60/303
(58) Field of Classification Search ............... 60/286, 60/295, 301, 303; 222/148–151
See application file for complete search history.

(56) References Cited

U.S. PATENT DOCUMENTS

| 3,100,376 | A | | 8/1963 | Potter | |
|---|---|---|---|---|---|
| 5,065,576 | A | * | 11/1991 | Kanazawa et al. | 60/295 |
| 5,366,401 | A | * | 11/1994 | Nanami et al. | 440/89 R |
| 7,500,356 | B2 | * | 3/2009 | Hirata et al. | 60/286 |

FOREIGN PATENT DOCUMENTS

| DE | 197 03 420 A1 | 8/1997 |
|---|---|---|
| EP | 0257236 A1 | 3/1988 |
| EP | 1371824 A1 | 12/2003 |

OTHER PUBLICATIONS

European Search Report dated Feb. 21, 2008.

* cited by examiner

*Primary Examiner* — Tu M. Nguyen
*Assistant Examiner* — Diem Tran
(74) *Attorney, Agent, or Firm* — Howard IP Law Group, PC

(57) ABSTRACT

The invention relates to an exhaust system for an internal combustion engine, in particular in a motor vehicle, comprising an exhaust line that carries the exhaust gas, an SCR catalyst system arranged in the exhaust line and an injection device arranged on the exhaust line upstream from the SCR catalyst system for injecting an aqueous urea solution into the exhaust line.

19 Claims, 3 Drawing Sheets

EXHAUST SYSTEM FOR AN INTERNAL COMBUSTION ENGINE

FIELD OF THE INVENTION

The present invention relates to an exhaust system for an internal combustion engine, in particular in a motor vehicle.

BACKGROUND OF THE INVENTION

To reduce the oxides of nitrogen, it is known that an SCR catalyst system may be arranged in the exhaust line carrying exhaust gas in an exhaust system, where SCR stands for selective catalytic reduction. Upstream from the SCR catalyst system, an injection device may be provided on the exhaust line, so that a so-called AdBlue system (AdBlue®), i.e., an aqueous urea solution, can be injected into the exhaust line. During operation of an internal combustion engine equipped with this type of exhaust system, the injection device sprays urea solution into the exhaust stream at a predetermined rate of metered addition. By hydrolysis, urea forms ammonia, triggering conversion of the oxides of nitrogen to nitrogen and water in the SCR catalyst.

For reasons of space, it is also customary to arrange the exhaust system in a motor vehicle along an underbody. Due to the low arrangement of the individual components of the exhaust system, any condensation fluid that develops can collect in the area of these components. With the SCR catalyst systems, it has been found that bearing mats with which individual catalyst elements are supported, held, protected from vibration and thermally insulated in a housing of the SCR catalyst system are arranged in the area of the condensation fluid that is formed and thus become fully saturated with it accordingly. As a rule, if the temperature of the exhaust system is high enough, the condensation fluid evaporates without leaving a residue, so that usually there is no impairment of function. However, at low ambient temperatures, in short distance operation and in modern diesel engines, it has become increasingly rare for the exhaust system to reach the temperatures required for evaporation of the condensation fluid.

In conjunction with urea injection, there may also be condensation of the injected urea solution in certain operating states. In evaporation of the water content of this solution, granular deposits of urea and other nitrogen compounds may be formed, which then do not evaporate until reaching much higher temperatures. If such deposits become embedded in the bearing mats of ceramic catalyst elements, the properties of these bearing mats may undergo deleterious changes. For example, the vibration damping effect is reduced, as is the thermal insulation effect. The bearing mat can no longer adjust elastically to the thermal expansion, so the retaining effect of the bearing mat for the respective catalyst element is reduced and the catalyst elements can move around in the housing. Likewise, a bypass flow may develop in the area of the damaged bearing mats, bypassing the respective catalyst element between the housing and the catalyst element.

It is likewise known that fuel may be injected upstream from an oxidation catalyst to achieve heating of the catalyst and/or a downstream particulate filter.

SUMMARY OF THE INVENTION

The present invention is based on the general idea of designing a sump in the exhaust system upstream from the respective catalyst system and downstream from the injection device so that condensation fluid can collect in this sump. If condensation fluid occurs, it can collect in the sump and can also evaporate from the sump at appropriate exhaust temperatures. If solid deposits occur, they remain in the sump and in particular cannot become incorporated into a bearing mat which serves to support the respective catalyst element in the catalyst system arranged downstream from the sump. In this way, a deleterious effect on this bearing mat due to the incorporation of solid-state residues of vaporized condensation fluid can be effectively reduced.

In a preferred embodiment, the sump is designed at the lowest point in the exhaust line in the installed state of the exhaust system, in particular at least between the injection device and the catalytic converter system. This design achieves the result that the condensation fluid can flow toward the sump and collect there regardless of where the respective condensate is formed. This achieves a targeted collection and evaporation of the condensate, such that at the same time a targeted deposition of the remaining solids in the sump is facilitated.

In advantageous embodiments, it is possible to provide for the sump to be arranged in the exhaust line so that its collecting volume is exposed to at least a portion of the exhaust gas flow. Additionally or alternatively, it is possible to provide for the exhaust line to be insulated thermally at least in the area of the sump. With the aforementioned measures, evaporation of condensation fluid is facilitated because a targeted oncoming flow of condensate in the sump is promoted on the one hand, while on the other hand, heating of condensate in the sump is promoted.

It is self-evident that the measures mentioned above and those yet to be explained below may be used not only in the particular combination indicated but also in other combinations or alone without going beyond the scope of the present invention.

Preferred exemplary embodiments of the present invention are characterized in the drawings and are explained in greater detail in the following description, where the same reference numerals are used to refer to the same or similar or functionally identical components.

DETAILED DESCRIPTION OF THE INVENTION

Figure 1:
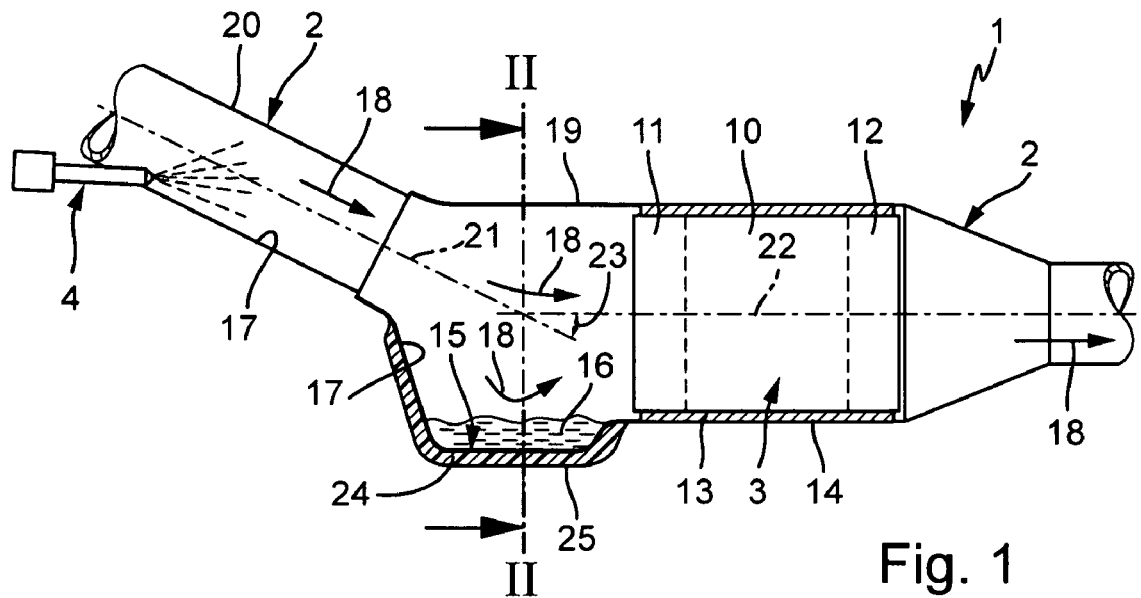
FIG. 1 shows a greatly simplified basic longitudinal section through a part of an exhaust system in the area of the sump.

According to FIG. 1, an exhaust system 1 comprises an exhaust-carrying exhaust line 2 and a catalyst system 3 which is arranged in the exhaust line 2 and is preferably designed as an SCR catalyst system 3. Furthermore, the exhaust system 1 comprises an injection device 4 which is arranged on the exhaust line 2 upstream from the SCR catalyst system 3 and is designed so that it can spray an aqueous urea solution into the exhaust line 2. According to FIGS. 5 and 6, the exhaust system 1 serves to carry the exhaust gases away from an internal engine 5. For example, the internal combustion engine 5 and the exhaust system 1 are installed in a motor vehicle 6 for this purpose. The exhaust system 1 may optionally include an oxidation catalyst 7 and a particulate filter 8 in the exhaust line 2. The oxidation catalyst 7 and the particulate filter 8 are arranged upstream from the SCR catalyst system 3 and upstream from the injection device 4 in the exhaust line 2. The particulate filter 8 is expediently arranged downstream from the oxidation catalyst 7. Downstream from the SCR catalyst system 3, the exhaust system 1 may have a muffler 9 and/or a muffler system 9 in the exhaust line 2.

The SCR catalyst system 3 comprises at least one SCR catalyst element 10, in which the oxides of nitrogen can be reduced to nitrogen and water with the help of ammonia. A hydrolysis catalyst element 11 which is optionally connected upstream from the SCR catalyst element 10 supports a hydrolysis reaction in which the aqueous urea solution injected into the exhaust gas is converted to ammonia and water. Furthermore, an additional oxidation catalyst element 12 may optionally be connected downstream from the at least one SCR catalyst element 10, allowing conversion of residual ammonia and hydrocarbons possibly remaining in the exhaust.

The respective SCR catalyst element 10 is expediently surrounded by a bearing mat 13 along its circumference. In the example according to FIG. 1, the SCR catalyst element 10 is enclosed jointly with the hydrolysis catalyst element 11 and the oxidation catalyst element 12 in a joint bearing mat 13. The bearing matt 13 serves to fix the position of the respective element 10, 11, 12 in a housing 14 of the SCR catalyst system 3. The bearing mat 13 causes an axial fixation of the respective SCR catalyst element 10 within the housing 14, which is achieved by a corresponding radial pressing of the bearing mat 13 between the housing 14 and the respective SCR catalyst element 10. In addition, the bearing mat 13 serves to provide thermal insulation for the housing 14 with respect to the SCR catalyst element 10 which becomes comparatively hot during operation. Furthermore, the bearing mat 13 causes a sealing of the ring gap that is formed between the housing 14 and the respective SCR catalyst element 10 and is filled by the bearing mat 13 to prevent a bypass flow, which would bypass the respective SCR catalyst element 10. The bearing mat 13 is made of a flexible material so that it can conform elastically to thermally induced expansion processes, leading to relative movements between the respective SCR catalyst element 10 on the one hand and the housing 14 on the other hand. Furthermore, the bearing mat 13 produces a vibration damping effect for the respective SCR catalyst element 10 which can be made of a ceramic monolith in particular and is sensitive to impact accordingly.

The exhaust system 1 is also furnished with a sump 15 which is situated downstream from the injection device 4 in the exhaust line 2 and upstream from the SCR catalyst system 3 and which has a collecting volume 16. The collecting volume 16 serves to receive condensate and/or condensation fluid which may be formed during operation of the exhaust system 1. For example, water vapor or fuel vapor or vaporized urea solution entrained in the exhaust gas may condense on the cold walls of the exhaust line 2, the housing 14 or another housing. Such a sump 15 for receiving and collecting condensation fluid is necessarily arranged at a low-lying location within the exhaust system 1 so that condensate, which can essentially condense at any location inside the exhaust line 2, can flow in the direction of the sump 15 due to gravity.

Figure 3:
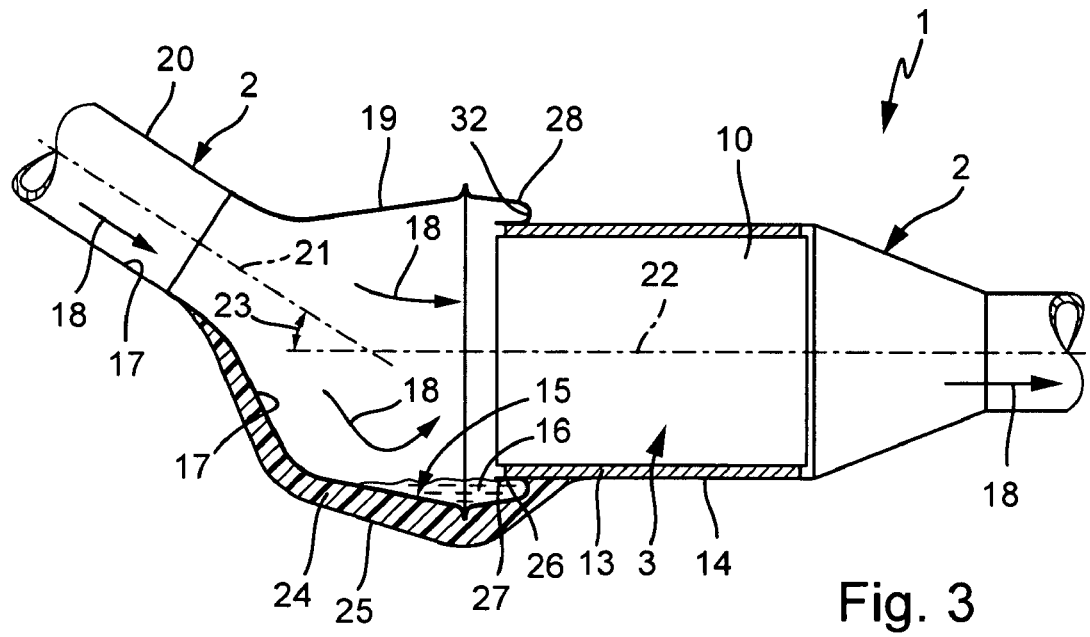
FIG. 3 shows a view like that in FIG. 1 but of another embodiment.
Figure 4:
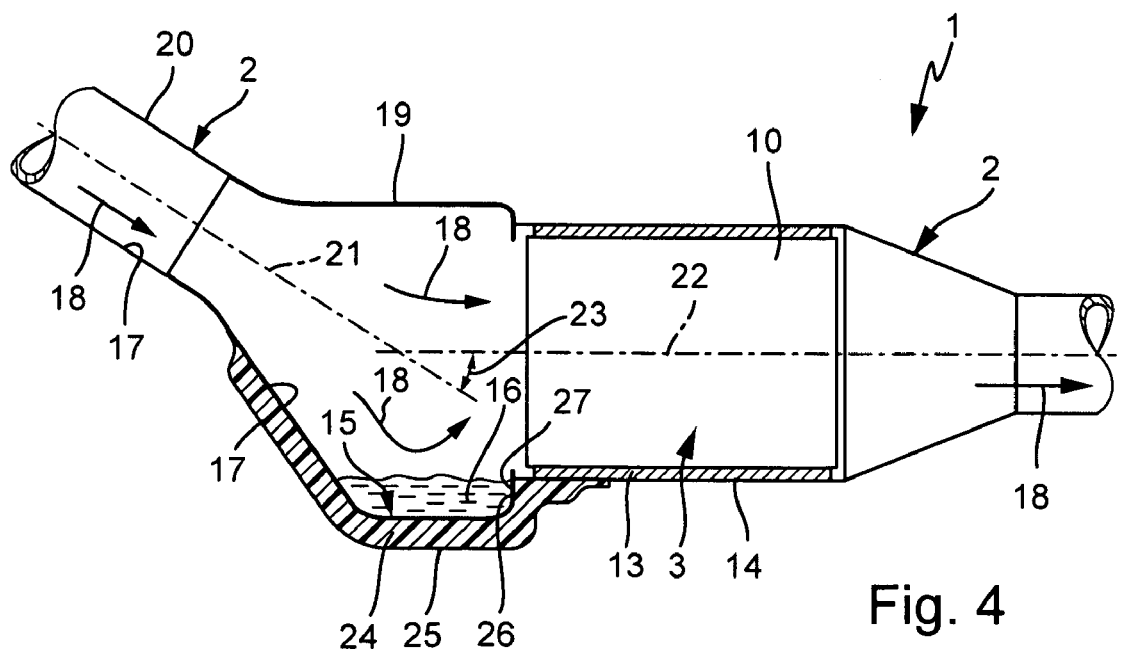
FIG. 4 shows a view like that in FIG. 1 but of an additional embodiment.
Figure 5:
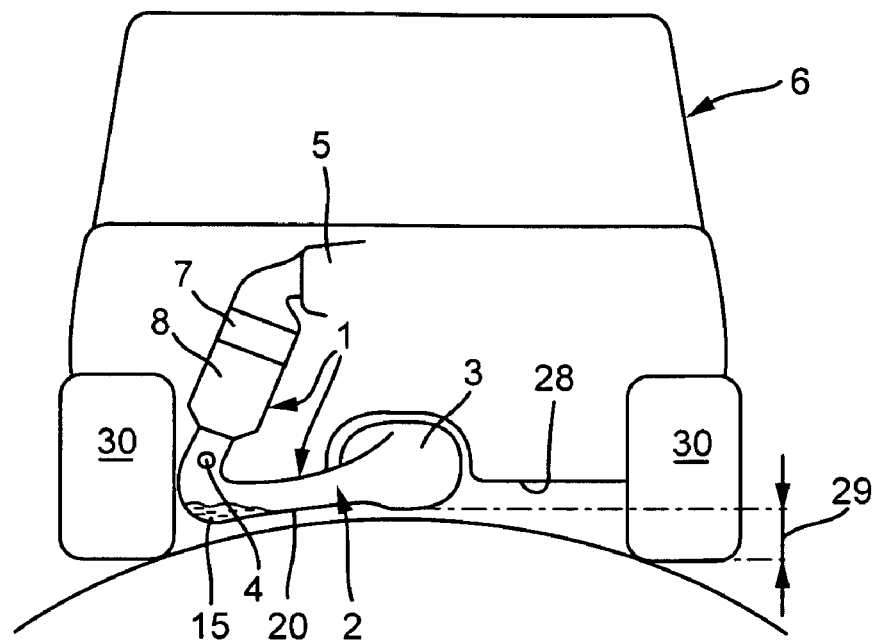
FIG. 5 shows a greatly simplified, partially cut-away frontal view of a motor vehicle equipped with the exhaust system.
Figure 6:
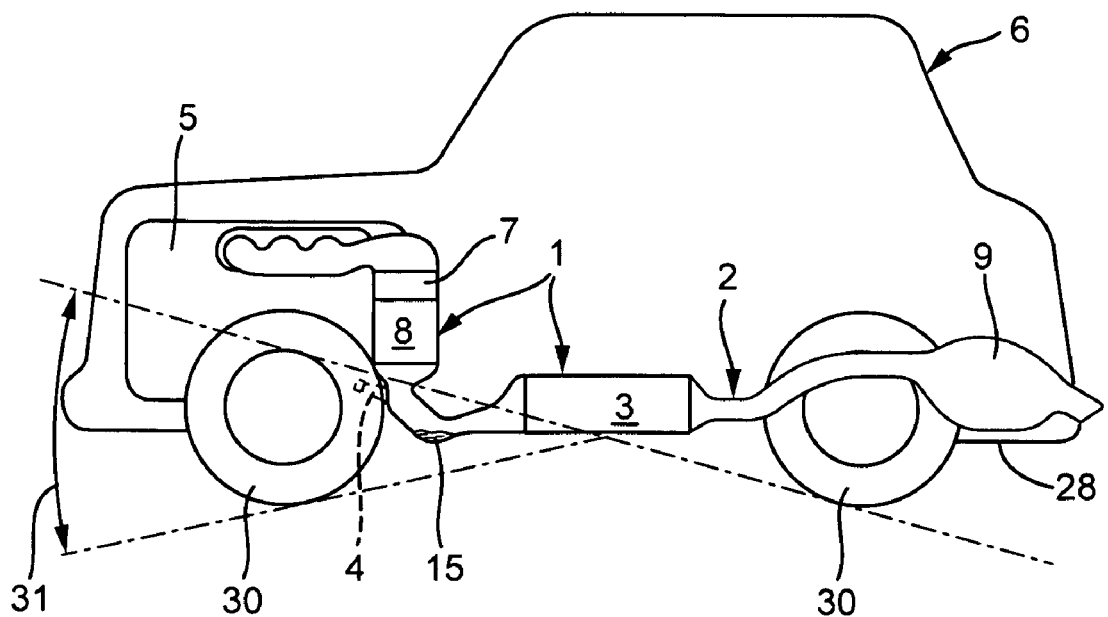
FIG. 6 shows a greatly simplified partially cut-away side view of the motor vehicle.

In the embodiments shown here in FIGS. 1 through 6, the sump 15 is designed in a wall 17 of the exhaust line 2, in particular in housing 14 which borders a flow path 18, represented by arrows, for the exhaust gas flow carried in the exhaust line 2. The sump 15 is formed by a trough or a bulge worked into the wall 17 and/or shaped thereon. In the embodiments according to FIGS. 1 through 4, the sump 15 is integrated into the housing 14 of the SCR catalyst system 3, in particular into an intake funnel 19 of the housing 14. Said housing 14 is a part of the exhaust line 2 which serves to accommodate the SCR catalyst system 3. In the embodiments of FIGS. 5 and 6, the sump 15 is designed in a tubular body or an exhaust pipe 20, such that this exhaust pipe 20 leads to the housing 14 containing the SCR catalyst system 3. Moreover the injection device 4 may also be arranged on this exhaust pipe 20.

In the installed state of the exhaust system 1, the sump 15 is expediently arranged inside the exhaust line 2, so that it is adjacent to the flow path 18 from underneath, i.e., at the bottom. Preferred embodiments are those in which the sump 15 is arranged at the lowest point in the exhaust line 2 within the entire exhaust system 1 or at least within a section of the exhaust system 1 extending from the injection device 4 up to the SCR catalyst system 3 and/or forms the lowest point in the exhaust line 2. This achieves the result that at least the injected urea solution, inasmuch as it condenses upstream from the SCR catalyst system 3, enters the sump 15 and at any rate does not reach the SCR catalyst system 3 or the bearing mat 13.

The arrangement of a sump 15 inside the exhaust line 2 is also done in such a way that its collecting volume 16 is exposed to at least a portion of the exhaust flow during the operation of the exhaust system 1. This is accomplished by exposing the collecting volume 16 directly to the exhaust gas flow. For example, as in the embodiments of the flow path 18 indicated here, it may be carried within the exhaust line 2 in such a way that there is flow deflection in the area of the sump 15 at least for a portion of the exhaust gas flow. For example, an oncoming flow longitudinal central axis 21 and an outgoing flow longitudinal central axis 22 may form an angle 23 in the area of the sump 15. The oncoming flow longitudinal central axis 21 prevails in a section of the exhaust line 2 connected upstream from sump 15, while the outgoing flow longitudinal central axis 22 is predominant in a downstream section of the exhaust line 2 adjacent to the sump 15. Due to this break in the exhaust line 2 and/or due to the deflection of the flow path 18 in the area of the sump 15, a direct exposure of the collecting volume 16 to hot exhaust gases can be achieved. This supports evaporation of condensate in the sump 15.

To additionally improve the evaporation of the condensate collecting in the sump 15, the exhaust line 2 may be provided with a thermal insulation 24 at least in the area of the sump 15. For example, a sheet metal body 25 may be mounted on the outside of the wall 17 of the exhaust line 2 in the area of the sump 15 to form a cavity here which can be filled especially with a thermally insulating material. This insulation 24 makes it possible to reduce the radiant heat to the outside in the area of the sump 15, which retards cooling of the condensate. As a countermeasure, this supports the heating of the condensate for evaporation of same. If the exhaust line 2 has thermal insulation anyway, it is possible to provide for this to be designed somewhat thicker at least in the area of the sump 15 than in the adjacent areas of the exhaust line 2.

Figure 2:
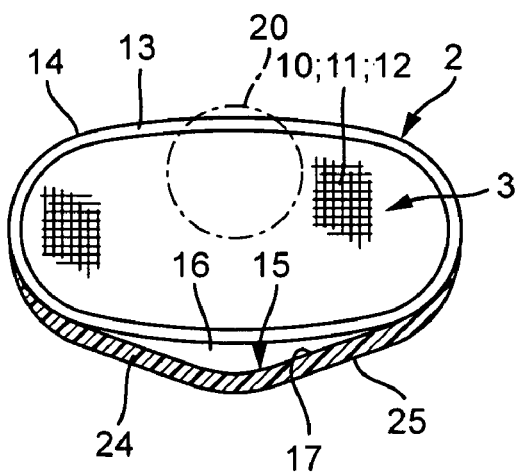
FIG. 2 shows a cross section through the exhaust system from FIG. 1 according to sectional lines II.

FIG. 2 also shows that the sump 15 may be designed in the form of a trough or a wedge, so the collecting effect is concentrated toward the center of the collecting volume 16.

FIGS. 3 and 4 show embodiments in which the sump 15 is equipped with a baffle 26. The baffle 26 is designed at least in a section of the sump 15 facing the SCR catalyst system 3. The baffle 26 serves to prevent an outflow of condensate out of the collecting volume 16 at least in the direction of the SCR catalyst system 3 for the event when movement occurs in the condensation fluid due to acceleration of the vehicle 6 equipped with the exhaust system 1. With the embodiments shown here, this baffle 26 is formed by a sump edge 27. In the embodiment illustrated in FIG. 3, the sump edge 27 is designed as an example on a separate component 28, by means of which the intake funnel 19 is connected to the housing 14, in which the SCR catalyst system 3 is arranged, in an area facing the SCR catalyst system 3. Likewise, the sump edge 27 may also be designed to be integral with the intake funnel 19 or as an integral part of the housing 14. In the embodiment shown in FIG. 3, the sump edge 27 is shaped and/or designed in the outflow area in such a way that it covers the collecting volume 16 at the edge essentially in parallel with the flow path 18, i.e., in parallel with the outgoing flow longitudinal central axis 22. At the same time, the entire component 28 is designed in this case so that it forms a trough 32 adjacent to the sump 15 on the outgoing flow side surrounding the flow path 18 on the periphery and/or in the form of a ring and collects fluid that flows down the wall 17 due to flow forces and sends it to the sump 15.

With the embodiment shown FIG. 4, the sump edge 27 is designed as an integral part of the intake funnel 19 such that it is designed so that it extends across the flow path 18 and/or across the outgoing flow longitudinal central axis 22 in the area facing the SCR catalyst system 3. In addition, the sump edge 27 may extend at least slightly into the flow path 18.

FIGS. 5 and 6 serve to illustrate a preferred insulation site and/or a preferred positioning of the sump 15 within the exhaust line 2 when the exhaust system 1 is mounted on the vehicle 6. The exhaust system 1 extends largely along an underbody 28 of the vehicle 6, such that as a rule, a central arrangement with regard to the longitudinal central axis of the vehicle 6 is preferred. To implement a required minimum ground clearance 29 with respect to the transverse direction of the vehicle, a sump 15 is offset laterally out of the longitudinal central plane of the vehicle 6, for example, namely is arranged in the direction of one of the wheels 30. This makes it possible to position the sump 15 at a lower point than the other components of the exhaust system 1, which are arranged centrally on the vehicle 6 and nevertheless achieve the desired value for the ground clearance 29. Furthermore, according to FIG. 6, the sump 15 may be arranged so that it is offset with respect to the longitudinal center of the vehicle, preferably toward the front, preferably also relatively close to one of the wheels 30. In this way, the curvature angle or ramp angle 31 desired for the vehicle 6 can be implemented even if the sump 15 is situated at a lower point than the centrally arranged components of the exhaust system 1, namely the SCR catalyst system 3 here. The sump 15 in particular is arranged at a location on the underbody 28 that is protected from splashed water and/or wind thanks to the preferred installation states of the exhaust system 1 shown here. This permits a reduction in the cooling effect of exposure to wind from driving and/or to splashed water in the area of the sump 15, thus promoting evaporation of condensate in the sump.

The invention claimed is:

1. An exhaust system for an internal combustion engine, in a motor vehicle, comprising:
   an exhaust line that carries exhaust gas,
   a housing;
   a catalyst system contained in the housing;
   an injection device, which is arranged upstream from the catalyst system on the exhaust line for spraying a liquid into the exhaust line, and
   a sump defined in the housing between the injection device and the catalyst system in the exhaust line, the sump having a collecting volume to receive condensation fluid,
   wherein, the collecting volume of the sump is the sole collecting volume in the housing, independent of the operating state of the internal combustion engine.

2. The exhaust system according to claim 1, wherein the sump is formed by a trough or a bulge defined in a wall of the housing in the exhaust system bordering the flow path.

3. The exhaust system according to claim 1, wherein the sump in the installed state of the exhaust system is adjacent to the flow path of the exhaust line at the bottom.

4. The exhaust system according to claim 1, wherein the sump is defined at the deepest point in the exhaust system in the installed state of the exhaust system.

5. The exhaust system according to claim 1, wherein the sump is defined at the lowest point in a section of the exhaust line situated between the injection device and the catalyst system in the installed state of the exhaust system.

6. The exhaust system according to claim 1, wherein the sump is arranged in the exhaust line so that its collecting volume is exposed to at least a portion of the exhaust flow.

7. The exhaust system according to claim 1, wherein the flow path is carried in the exhaust line in such a way that a flow deflection develops in the area of the sump for at least a portion of the exhaust flow.

8. The exhaust system according to claim 1, wherein the exhaust line has thermal insulation at least in the area of the sump.

9. The exhaust system according to claim 1, wherein the exhaust line has thicker thermal insulation in the area of the sump than in adjacent areas.

10. The exhaust system according to claim 1, wherein the sump is arranged in a location on the underbody of the vehicle that is protected from at least one of splashed water and wind in the installed state of the exhaust system.

11. The exhaust system according to claim 1, wherein the catalyst system is a SCR catalyst system arranged in the exhaust line.

12. The exhaust system according to claim 1, wherein the sump is defined in the housing that contains the catalyst system in an intake funnel of the housing.

13. The exhaust system according to claim 1, wherein the sump is equipped with a baffle which at least prevents the condensation fluid from flowing out of the collecting volume in the direction of the catalyst system when there is movement in the condensation fluid.

14. The exhaust system according to claim 13, wherein the baffle is formed by a sump edge.

15. The exhaust system according to claim 14, wherein the sump edge is aligned across the flow path at least in an area of the sump facing the catalyst system.

16. The exhaust system according to claim 14, wherein the sump edge is aligned vertically at least in an area of the sump facing the catalyst system.

17. The exhaust system according to claim 14, wherein the sump edge protrudes into the flow path at least in an area of the sump facing the catalyst system.

18. The exhaust system according to claim 14, wherein the sump edge covers the collecting volume at the edge in parallel with the flow path at least in an area of the sump facing the catalyst system.

19. An exhaust system for an internal combustion engine, in a motor vehicle, comprising:
- an exhaust line that carries exhaust gas,
- a housing;
- a catalyst system contained in the housing;
- a bearing mat positioned between an inner wall of the housing and the catalyst system for axially fixing the catalyst system within the housing;
- an injection device arranged on the exhaust line and upstream from the catalyst system for spraying a liquid into the exhaust line; and
- a sump defined in the housing between the injection device and the catalyst system in the exhaust line, the sump having a collecting volume to receive condensation fluid, wherein, the surface of the housing in contact with the bearing mat is so adapted that condensation fluid formed on any location of the surface of the housing flows to said sump due to gravity.

* * * * *